Oct. 8, 1957  E. L. E. HUMPHRISS  2,808,991
DEVICE FOR USE DURING THE PREPARATION OF MIX
BATCH RECIPES OR FORMULAE FOR COMESTIBLES
Filed May 14, 1954  2 Sheets-Sheet 2
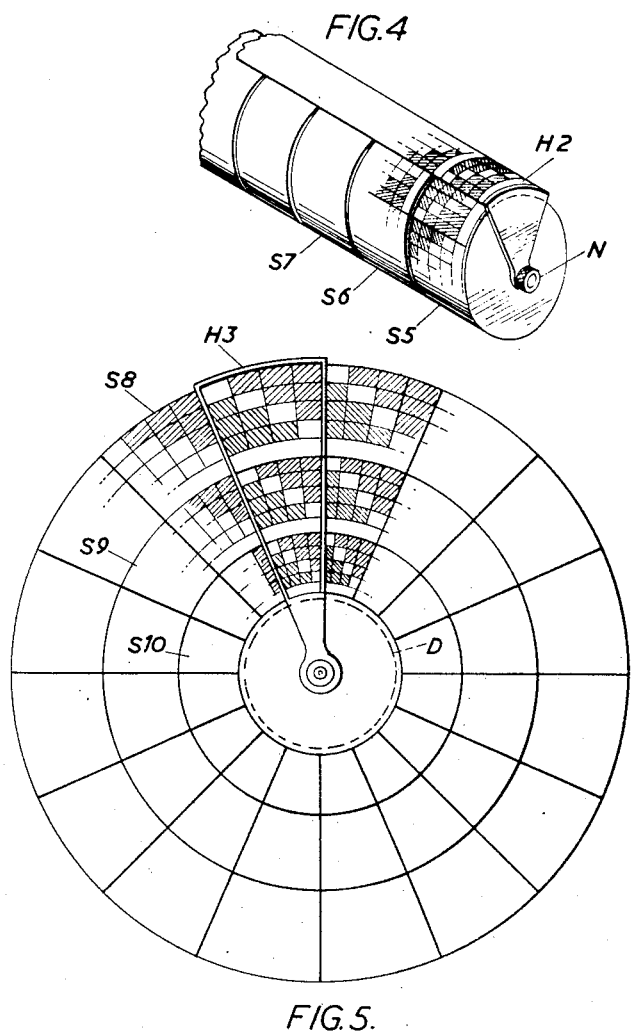
Inventor,
ERIC LEWIS ENOCH HUMPHRISS,
By
Mead, Browne, Schuyler & Beveridge,
Attorneys United States Patent Office 2,808,991
Patented Oct. 8, 1957

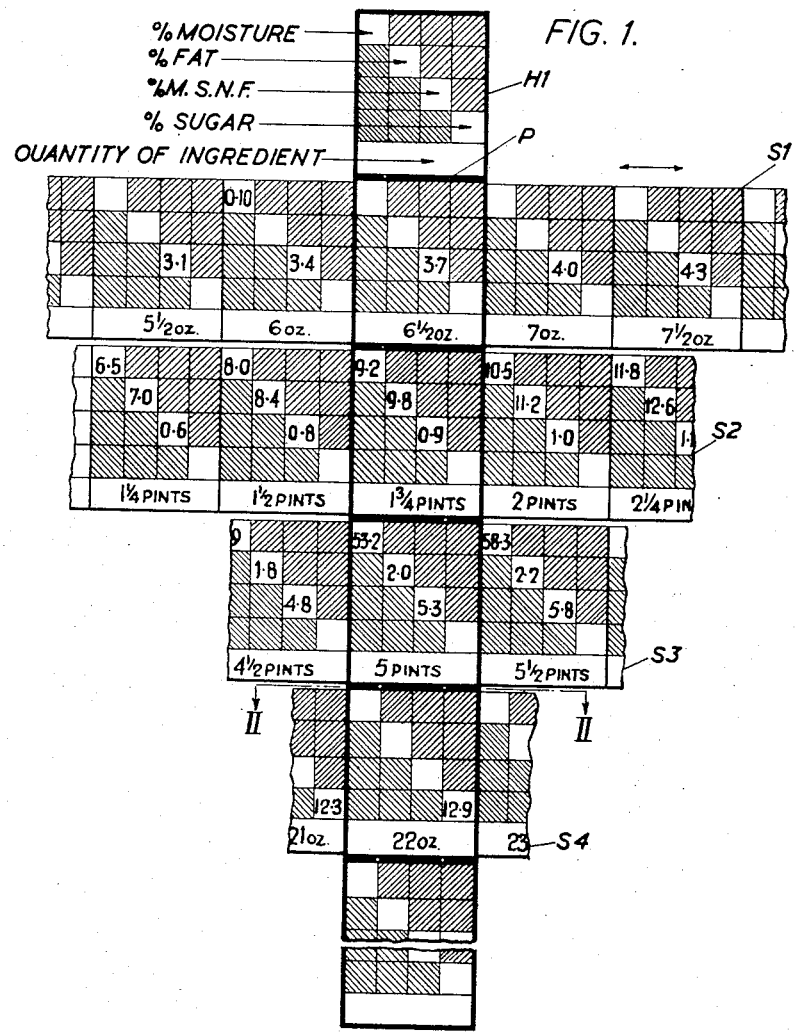

2,808,991

DEVICE FOR USE DURING THE PREPARATION OF MIX BATCH RECIPES OR FORMULAE FOR COMESTIBLES

Eric Lewis Enoch Humphriss, Woolton, Liverpool, England

Application May 14, 1954, Serial No. 429,891

Claims priority, application Great Britain, May 19, 1953

5 Claims. (Cl. 235—87)

This invention concerns a device for use during the preparation of mix batch recipes or formulae for comestibles, such as ice-cream, and other analagous food products in which it is necessary to commence by making a mix from several ingredients. Normally a specification, which gives the required analytical proportions of constituents by percentage, is first provided, or decided upon, and it is then necessary to prepare a working mix recipe or formula which meets the requirements of the specification within narrow limits.

This would be a simple matter if all the ingredients to be utilized comprised only a single constituent i. e. sugar or 100% oil or 100% fat, containing no moisture or other solids. However, most of the ingredients used in food products are of a compound or composite nature. For instance, in the manufacture of ice-cream, compound ingredients such as full cream sweetened condensed milk which contains fat, milk solids not fat, sugar and moisture in various percentages, or sweetened fat which contains percentages of both fat and sugar. The matter therefore becomes somewhat complicated, as it is necessary to consider the percentage content of each constituent in each ingredient; and to obtain a mix which complies with a set specification, a complicated calculation involving simultaneous equations must be made or other equally complex and laborious method used, in most cases, to determine the quantities of each ingredient to be used.

The object of the present invention is to provide a means for avoiding the necessity of making such calculations, which can be extremely tedious and time consuming.

According to the present invention, a device for use in the preparation of mix batch recipes or formulae for comestibles comprises a holder and a plurality of members, one member representing each of the ingredients to be used in said comestible and being divided into a number of sections, each section having marked thereon a quantity by weight or volume of the ingredient represented, and the percentages or proportions of each constituent conferred on the mix by said quantity, by weight or volume of that ingredient, the holder being constructed to allow a number of the members, dependent upon the number of ingredients, to be adjustably accommodated therein in juxtaposition so that one section of each member may be visible through an opening or window in said holder. The members may each be sliders in the form of a long, thin, rectangular strip of compressed cardboard, plastic or even metal, arranged to slide horizontally one above the other in a vertically arranged holder constructed of similar material. Alternatively the members may be in the form of thin discs of different diameters arranged as required one above another for concentric rotation about a centre point carried by a sector-shaped holder. As each disc is rotated it slides through the holder, and the markings on each section of the disc each become visible one after the other, through the opening or window in the holder. In both these constructions, to reduce the overall number of members, both sides thereof may carry markings, or alternatively they may be marked for different mix batch sizes on opposite faces.

In another form of construction, the members comprise bobbins, that is to say discs of greater thickness, which bear the markings around their outer peripheries. In this case the chosen bobbins are threaded on a spindle carried by arms of the holder. The main body of the holder, through which the selected sections of each bobbin are viewed, extends along the peripheries. Spacing discs may be required in this form of the device.

The invention will now be further described by way of example with reference to the accompanying drawings, in which:

Fig. 1 is a plan view of one form of the device according to the invention;

Fig. 2 is a section on the line II—II of Fig. 1;

Fig. 3 is a partial side view of the device shown in Fig. 1;

Fig. 4 is a fragmentary perspective view of an alternative embodiment of the device according to the invention, and Fig. 5 is a diagrammatic plan view of yet another embodiment.

In the construction illustrated in Figs. 1 to 3 the holder H1 is formed by two vertical strips of material, the upper one H at least of which is transparent fastened together in spaced relationship by pegs or pins P. These pegs or pins P are positioned to define spaces between the two strips of the holder, which spaces are each of such a size as to just accommodate a member. In this construction the members are in the form of long rectangular strips constituting sliders and four of them, S1, S2, S3 and S4 are shown accommodated in the holder H1. Each slider is capable of being moved independently in a horizontal direction as shown by the arrow in Fig. 1, and may be removed and replaced by another slider.

Each slider represents an ingredient of the comestible under preparation and is divided into a number of sections, each equal in width to the width of the holder H1 (see Fig. 1). The sections are subdivided and carry markings giving the quantity by weight or volume of the ingredient represented by the section and the percentages or proportions of each constituent conferred on the mix by that quantity. In the constructions shown, which are suitable for use in the preparation of mix batch recipes for ice-cream, each section of the sliders show, apart from the quantity of the ingredient represented, the percentage moisture, percentage fat, percentage milk solids not fat and percentage sugar which the quantity of the ingredient will contribute to the mix. The markings are staggered across the sections (see Fig. 1) so that the percentage moisture figures for each ingredient are shown one above the other and summation thereof is relatively easy. Similarly, the percentages of the other constituents each appear in a vertical column within the holder.

During and after adjustment of the sliders, as will be hereinafter described, the various sections are viewed through the upper holder strip H. The top of the holder is conveniently formed as the section of a slider but instead of containing markings, it indicates to the user the constituents to which the slider markings refer (see top of Fig. 1 in which the abbreviation M. S. N. F. stands for milk solids not fat). The bottom of the holder may, if desired, be left blank and roughened, so that it may be used for writing summations thereon, which may be readily erased when the calculation is completed.

The holder H1 may be made any convenient length to accommodate any number of sliders, although in calculations relating to ice-cream it is unlikely that more than seven sliders (i. e. seven ingredients) will be used.

The figures indicating the actual quantity of ingredients are preferably differently arranged from the other markings, so that they may more readily be distinguished. Colours may advantageously be used on the holder and sliders to assist the operator and speed manipulation, and these are indicated in Fig. 1 of the drawings by different shading. One or both sides of the sliders may be used. The sliders are tabulated to give a standard quantity of mix from which, by simple proportions, the amounts of each ingredient for any quantity of mix may be determined. The markings and graduations may be adapted for those in general use in standard practice in the country in which the device is to be used.

The device is particularly applicable for use in the preparation and manufacture of ice-cream and an example of such use is given hereunder, with reference to Fig. 1.

Suppose it was desired to make an ice-cream mix to the following specification:

|  | Percent |
|---|---|
| Fat | 12 |
| Milk solids not fat | 10 |
| Sugar | 13 |
| Stabilizer, emulsifying agent and egg | 2.25 |
| Total solids | 37.25 |

Then, moisture content $=100-37.25=62.75\%$. It may be decided that the following ingredients (constituents shown in brackets) are to be used:

Full cream milk (3.3% fat, 8.8% milk solids not fat, 87.9% moisture

Cream—50% (50% fat, 4.5% milk solids not fat, 45.5% moisture)

Skimmilk powder (97% milk solids not fat, 3% moisture) (100% sugar)

By taking the four appropriate sliders, which in the example shown in Fig. 1 are, S1 for skimmilk powder, S2 for 50% cream, S3 for full cream milk and S4 for sugar and adjusting them in the holder H1 so that the (a) fat figures as percentages, conferred on the mix by the quantities of ingredients indicated on the sections visible through the holder, add up to the required fat content of the mix (12% in the example taken), (b) the M. S. N. F. figures as percentages, conferred on the mix by the quantities of ingredients indicated on the sections visible, add up to the required M. S. N. F. content of the mix (10% in the present case), and likewise with (c) the sugar and (d) moisture figures, it is possible to arrive at the specific amounts of each ingredient required to give say unit quantity of mix. In this example:

6½ ozs. of skimmilk powder
1¾ pins of 50% cream
5 pints of full cream milk, and
22 ozs. of sugar would give 1 gallon of mix with the following specification:

11.8% fat
9.9% milk solids—not fat
12.9% sugar
62.4% moisture i. e. one corresponding, within very small limits to the specification.

In an alternative form of construction shown in Fig. 4, the members are in the form of thick discs or bobbins S5, S6, S7 and so on, threaded on to a spindle carried by arms of the holder H2, which in this case extends along a portion of the peripheries of the members. The bobbins in this arrangement are interchangeable by removal of the nut N from one end of the spindle, which is then withdrawn. The sections of the members, and the markings and details contained therein, are arranged around the outer edge of the thick discs or bobbins. Sufficient play is allowed on the spindle to allow each of the bobbins to be easily rotated independently.

In yet another embodiment of the device, illustrated in Fig. 5, the members are formed by thin circular discs S8, S9 and S10 of different diameters mounted one above the other for rotation about a central pivot. Distance pieces D may be provided between each successive disc to facilitate rotation and reduce binding. The central pivot is removably carried by the holder H3, which in this construction is sector-shaped, so that discs can be interchanged and built up as required. In this construction it is necessary to ensure that all discs relating to ingredients which are likely to be used in any one particular mix are of different diameters. The sections and markings are arranged radially in those outer parts of the discs which are visible when the device is assembled (see Fig. 5).

The method of operation of the embodiments of Figs. 4 and 5 is similar to the described earlier.

Obviously, the device may be used in reverse to determine the theoretical analysis of a mix given the batch recipe or formula.

The device of the invention may be used to obtain an even greater degree of accuracy than that shown by way of example, by visual interpolation of both quantities and ingredient constituent percentages between the figures marked on the members.

I claim:

1. A device for use in the preparation of mix batch recipes for comestibles comprising a holder and a plurality of members, each of said members representing one of the ingredients to be used in said comestible and being divided into a number of sections, each of said sections having marked thereon a quantity of the ingredient represented, and the proportions of said constituent conferred on the mix by said quantity of that ingredient, said holder being constructed to allow a number of said members, dependent upon the number of ingredients, to be adjustably accommodated therein in juxtaposition so that one section of each of said members may be visible through said holder.

2. A device for use in the preparation of mix batch recipes for comestibles comprising a holder and a plurality of long, thin, rectangular strip sliders arranged to slide horizontally one above the other in said holder, each of said sliders representing one of the ingredients to be used in said comestible and being divided into a number of sections, each of said sections having marked thereon a quantity of the ingredient represented, and the proportions of said constituent conferred on the mix by said quantity of that ingredient, said holder being constructed to allow a number of said sliders, dependent upon the number of ingredients, to be adjustably accommodated therein in juxtaposition so that one section of each of said sliders may be visible through said holder.

3. A device for use in the preparation of mix batch recipes for comestibles comprising a holder and a plurality of long, thin rectangular strip sliders adapted to slide horizontally one above the other in said holder, each of said sliders representing one of the ingredients to be used in said comestible and being divided into a number of sections, each of said sections having marked thereon in staggered relationship a quantity of the ingredient represented, and the proportions of said constituent conferred on the mix by said quantity of that ingredient, said holder being constructed to allow a number of said sliders, dependent upon the number of ingredients, to be adjustably accommodated therein in juxtaposition so that one section of each of said sliders may be visible through said holder.

4. A device for use in the preparation of mix batch recipes for comestibles comprising a sector-shaped holder and a plurality of thin discs of different diameters arranged one above the other for concentric rotation about a center point carried by said holder, each of said discs representing one of the ingredients to be used in said comestible and being divided into a number of sections, each of said sections having marked thereon a quantity of the ingredient represented, and the proportions of said constituent conferred on the mix by said quantity of that ingredient, said holder being constructed to allow a number of said discs, dependent upon the number of ingredients, to be adjustably accommodated therein in juxtaposition so that one section of each of said discs may be visible through said holder.

5. A device for use in the preparation of mix batch recipes for comestibles comprising a holder and a plurality of bobbins mounted for independent rotation upon a spindle carried by arms of said holder, each of said bobbins representing one of the ingredients to be used in said comestible and being divided around its periphery into a number of sections, each of said sections having marked thereon a quantity of the ingredient represented, and the proportions of each constituent conferred on the mix by said quantity of that ingredient, said holder being constructed to extend along the peripheries of said bobbins, so that one section of each bobbin may be visible through said holder.

References Cited in the file of this patent

UNITED STATES PATENTS

| | | |
|---|---|---|
| 1,207,439 | Picolet | Dec. 5, 1916 |
| 2,080,857 | Baer | May 18, 1937 |
| 2,469,022 | Walker et al. | May 3, 1949 |